Oct. 15, 1968  G. M. BELVA ET AL  3,405,462
DISPLAY DEVICE
Filed June 21, 1966
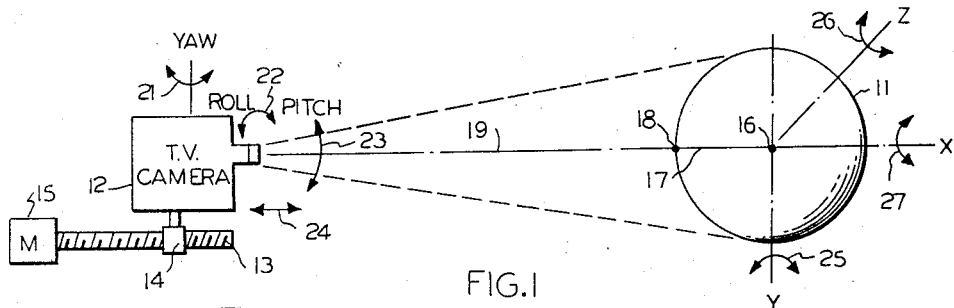
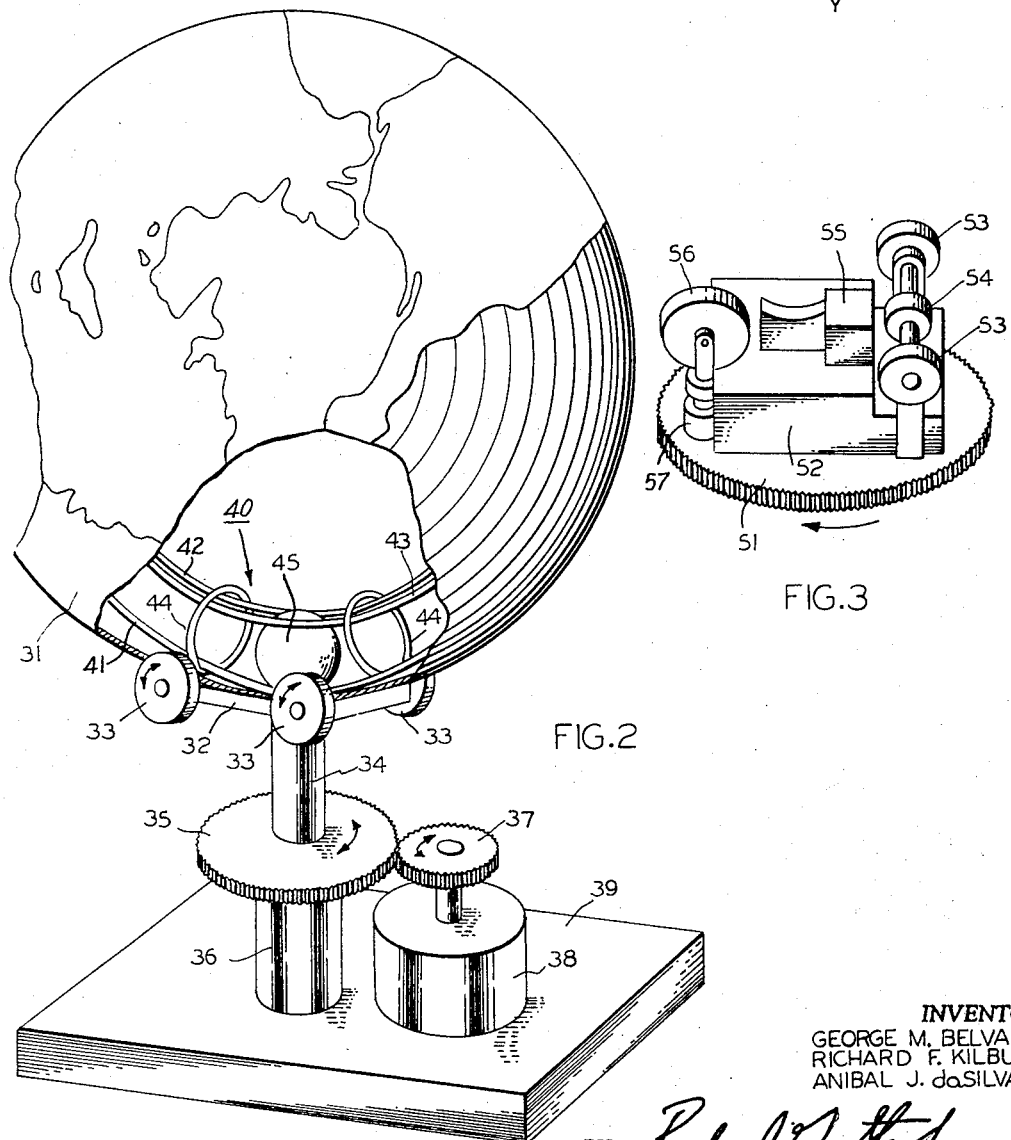
INVENTORS
GEORGE M. BELVA
RICHARD F. KILBURN
ANIBAL J. daSILVA
BY Richard J. Stephens
ATTORNEY

3,405,462
DISPLAY DEVICE
George M. Belva and Richard F. Kilburn, Vestal, N.Y., and Anibal J. da Silva, Houston, Tex., assignors to General Precision Systems Inc., a corporation of Delaware
Filed June 21, 1966, Ser. No. 559,167
1 Claim. (Cl. 35—46)

ABSTRACT OF THE DISCLOSURE

It is often necessary to support a sphere for controlled movement so that any selected point on its surface can be brought to a prescribed location. In the past, the spheres have been supported for rotation by external frameworks which obscured some portions of the spherical surface and which obliterated other portions. In the device of this invention a sphere is supported on wheels which can be driven to frictionally drive the sphere. Control of the direction of rotation is achieved in one embodiment by the use of a caged weight which tends to maintain the rotation along a particular circumference. The sphere is rotatively driven along a horizontal axis by the wheels and is rotated about a vertical axis by the rotation of the supporting platform. In a second embodiment, the sphere is frictionally driven in rotation by a pair of supporting wheels and the direction of rotation is determined by a controllable steering wheel upon which the sphere rests.

---

This invention relates to a display device, and, more particularly to a device or system for controlling which aspect of a freely movable body is presented to view at any time.

Display devices are used in many places and for many purposes. One of the best known uses for display devices, is, of course, for advertising purposes. However, in addition to inducing people to purchase the displayed item, displays have, in the more recent past, been increasingly used for educational purposes.

Most modern schools now have many visual aids. In addition to utilization in the elementary and secondary schools, display devices are also used in specialized education fields. This is particularly true in the training of personnel for the operation of extremely complex and expensive, as well as dangerous, modern vehicles of both travel and disaster. It is not feasible to train operating personnel of spacecraft by sending them on repeated trips through space to and from the Moon or even on repeated orbits around the Earth. They must be trained in equipment which simulates the operation of their space vehicles, and this equipment includes display devices.

One of the problems in simulating a mission through space has been to produce the proper visual stimulation which a space traveler would receive from the observation of celestial bodies and their relationships to each other. For example, during a "voyage to the Moon," a space traveler would see several aspects of the lunar body in addition to a continual growth in apparent size of the body as the traveler approached it. The past equipment which was used to produce visual displays of a celestial body of this nature included a closed television system for reproducing an image of the body as it appears from a fixed point. To provide changing aspects of the body itself; a three dimensional model of the body to be displayed was usually mounted on a plurality of axes, at least one of which required external gimbals and other supporting structure. In addition to interfering with a view of the mounted body, this sort of supporting structure also required penetration of the outer skin of the body and thus prevented a view of its entire surface.

It is an object of this invention to provide a new and improved mounting means for a rotatable member.

It is another object of this invention to provide a new and improved mounting and controllable driving system for a freely rotatable body.

It is a further object of this invention to provide a new and improved support and driving means to provide an unencumbered view of any portion of a model of a rotatable body.

Other objects and advantages of this invention will become apparent from the following description, which description should be considered together with the accompanying drawings in which:

FIG. 1 is a schematic illustration of a visual display system which has been used in many visual simulators;

FIG. 2 is a perspective view of the apparatus of this invention; and

FIG. 3 is a perspective view of a modification of a portion of the apparatus of FIG. 2.

Referring now to the drawings in detail, FIG. 1 shows in schematic form a system in which a model of a heavenly body is viewed by a television camera to produce a visual image elsewhere of that body. The reference character 11 designates a sphere, which is, for this discussion, assumed to be a model of the Moon. A television camera 12 is shown mounted on a lead screw 13 by means of a nut 14 or other suitable device. The lead screw 13 is rotated by a motor 15 which, in turn, is controlled by other means not shown here. The center of the sphere 11 is designated at 16 and lies on the optical axis 19 of the television camera 12. A point 18 is shown on the surface of the sphere 16 where it intersects the optical axis 19. The radius of the sphere is shown at 17.

In operation, the model 11 is mounted so that it is free to rotate in at least two directions. Thus, for example, the model 11 should be able to rotate about its center 16 on the Z axis as shown by the arrow 26. In addition, the model 11 should be mounted to be free to rotate about the Y, or vertical, axis as shown by the arrow 25. Thus, as the model 11 is caused to rotate about the two axes, the Y axis and the Z axis, the aspect presented to the television camera 12 is continually changed so that virtually every portion of the model 11 can be viewed by camera 12. By this means, the model 11 appears to have three degrees of freedom of rotation as viewed by the camera 12. In this manner, as the sphere 11 is moved about its two axes of rotation, its entire surface can be caused to pass under the scrutiny of the camera 12.

The television camera 12, however, is mounted so that it has three attitude degrees of freedom. Thus, the camera 12 is mounted, by any suitable means, such as a universal joint so that it can pitch to a limited extent as shown at arrow 23, so that it can roll to a limited extent shown at arrow 22 and so that it can yaw to a limited extent as shown by arrow 21. In addition, variations in the apparent size of the model as seen by the television camera 12 can be achieved by the operation of the motor 15 which moves the camera 12 on the lead screw 13 closer to or farther from the model 11 as shown by the arrow 24. Thus, the system of FIG. 1 represents a typical visual simulation system using closed circuit television and a model of the body to be displayed. Of course, it must be realized that FIG. 1 is rather schematic in nature. To simulate the appearance of an astronaut approaching the Moon, and then, possibly, orbiting it, the camera 12 is removed from the model 11 as far as possible on the screw 13. Then, the motor 15 is operated slowly so that the camera 12 gradually approaches the model 11 producing a television picture in which the Moon grows in apparent size as it would when approached. At the same time, the camera 12 is moved in pitch, roll and yaw to produce the effects of a space capsule in motion, and the model 11 is rotated on its two axes of rotation to simulate the actual motion of the moon.

As mentioned above, models such as the sphere 11 have long been mounted with three degrees of rotational freedom. However, the mounting means in the past have suffered from serious deficiencies by requiring supporting girders, gimbals, and the like, external to the sphere so that they interfere with a clear and unobstructed viewing thereof, and which penetrates the surface of the sphere, thereby producing defects in it. The device of FIG. 2 illustrates one means for supporting and driving the sphere without the above-mentioned disadvantages so that its position can be controlled accurately without the obstructions mentioned above.

A sphere 31, which for this discussion, may be considered to be a model of the Moon, such as the model 11 of FIG. 1, rests on four rotatable wheels 33 which may be individually shaped to the curvature of the sphere 31. The wheels 33 are carried by a base or carriage 32, which, in turn, is mounted on a shaft 34 attached to a gear 35 rotatably mounted in its entirety on a support 36. A motor 38 drives a gear 37 which meshes with a gear 35. The support 36 and the motor 38 are both carried on a base 39. A part of the covering of the sphere 31 is cut away in FIG. 2 to reveal within the sphere 31 a set of three rings 41, 42, and 43 which are tied together by smaller rings 44 to form a torroidal cage which encloses a heavy spherical mass 45. The smaller rings 44 have a diameter which is slightly larger than that of the mass 45 so that the spacing of the rings 41, 42, and 43 is great enough to permit the mass 45 to roll within the annular cage 40 thus formed.

In operation, the motor 38 can be energized to drive the gear 37 in either direction. This, in turn, causes gear 35 to rotate on the support 36. By this means, the carriage 32 which supports the wheels 33 also rotates with the motor 38. Thus, the sphere 31 can readily be caused to rotate about a vertical axis. If, in addition, it is desired to rotate the sphere 31 about a horizontal axis, then one or more of the wheels 33 can be rotatably driven by any suitable means (not shown). The sphere 31 is so placed that the cage 40 rests between the wheels 33 of each axial pair. The weight of the entire assembly is supported by the wheels 33. As the wheels 33 rotate, they frictionally engage the covering of the sphere 31 to cause the sphere 31 to rotate about its horizonal axis. Due to normal manufacturing differences, the forces applied by all of the rotating four wheels 33 to the surface of the sphere 31 will not always be identical. Because of this, there is often a tendency of the sphere 31 to drift in a direction which is other than the desired direction of motion. This drift is usually uncontrollable and would be a detriment in a simulation of a visual problem, for example, where realistic simulation is a requirement. To avoid this drift, the cage 40 which comprises the three rings 41, 42, and 43 is mounted within the sphere 31. The larger diameter ring 41 has approximately the same diameter as the inner surface of the sphere 31 and the other two rings 42 and 43 are slightly smaller in diameter. They are connected for mutual support by rings 44 to provide an annular container slightly larger in cross section than the mass 45 and within which the mass 45 is free to roll as the container revolves in its plane. As the sphere 31 is driven about a horizontal axis by means of the wheels 33, the mass 45 rolls freely in its cage 40 but tends to remain in its lowest possible position. Should the external forces which are applied to the sphere 31 cause it to drift slightly to the side, the cage 40 is rotated out of a vertical plane and, the mass 45 is raised higher than its lowest point and it exerts a force on the sphere 31 as a whole which tends to cause the sphere 31 to drift back so that the cage 40 is again balanced between the pairs of wheels 33. Thus, the mass 45 which is permitted to freely roll around an inside circumference of the sphere 31 within its cage inside the sphere 31 tends to insure that the rotation of the sphere 31 will be about the desired axis and be fully controllable. When the sphere 31 tries to move in a direction which causes the mass 45 in its annular cage 40 to be moved from its lowest point, the mass 45 exerts a component of force in a direction to oppose that movement. If the component is parallel to the cage 40, the mass 45 rolls in the cage to stay at its lowest point. If, however, the component is transverse to the cage 40, a force is thereby applied to the sphere 31 to oppose the movement. Thus, the mass 45 tends to remain at its lowest point and to keep the cage 40 positioned between the axial pairs of wheels 33.

In some cases, however, it is desirable to rotate the sphere 31 other than about a single horizontal axis. In such a system, the modification shown in FIG. 3 may be used. A base 51 carries a gear about its outer periphery. On the gear 51, a support housing 52 is carried. A pair of wheels 53 is connected to a differential 54 which may be driven at any suitable means not shown. A steerable or vertically rotatable wheel 56 is mounted on a support motor 57 also connected to the housing 52, and between the two wheels 53 and the single wheel 56 is a curved support or cradle 55 for carrying a substantial portion of the weight of a sphere 31, and in which an alignment sensing device may be provided.

The gear base 51 may be mounted on the support 36 freely rotatable thereon and may be engaged by the gear 37 to be rotated by the motor 38. In turn, the sphere 31 may be supported on the three wheels 53 and 56 and the cradle 55 so that it may be rotated thereon. In this apparatus, the sphere 31 does not contain the mass 45 and its cage, but instead comprises a substantially uniform, empty body which is light in weight and constructed to simulate the celestial body desired. Again, the base 51 may be rotated about a vertical axis as desired by the motor 38 which drives the gear 37 engaging the gear 51. Thus, as in the apparatus of FIG. 2, the sphere 31 is readily rotated about its vertical axis. The wheels 53 are driven through the differential 54, and, in turn, frictionally drive the sphere 31 by applying forces against its surface. As the sphere 31 rotates about a horizontal axis driven by wheels 53, it, in turn, drives the wheel 56. The single wheel 56 is mounted in this apparatus to be rotatable about a vertical axis by the motor 57. By the apparatus shown in FIG. 3, the direction of rotation of the sphere 31 about its horizontal axes can be determined to a great extent by the positioning of the wheel 56. Ordinarily, rotation of the wheels 53 will cause the sphere to rotate about a horizontal axis which is parallel to the axis connecting the two wheels 53. If, however, the wheel 56 should be rotated clockwise by the motor 57, then it would not roll freely with the sphere 31 but would exert a frictional force which would tend to cause the axis of rotation of the sphere 31 also to rotate clockwise. Since the wheels 53 are driven through a differential, one of the wheels 53 would speed up and move faster than the other to compensate for the drag placed on the sphere 31 by the rotated wheel 56. Thus, the wheel 56 can steer the sphere 31. Thus, the drive means of FIG. 3 is more versatile since it can rotate the horizontal axis in an infinite number of different directions. The device of FIG. 3 can be programmed to respond to external stimuli such as from a magnetic storage means, punched tape, or the like, to occupy variable positions at different points in time during the progress of a simulated mission.

The models 31 are readily replaced on the support and drive means merely by lifting the one presently in position and replacing it with another. If the primary object of a mission requires the rotation of the model 31 about a fixed horizontal axis, then the device of FIG. 3 may be used to maintain the model 31 properly aligned to rotate on a particular equator. In this case, a magnetized tape or track may be incorporated inside the model 31 on the desired equator. The saddle 55 contains a sensing means which is sensitive to the magnetic field of the magnetic tape and operates the steering mechanism 57 in response thereto. Should the model 31 drift slightly off the desired axis, the magnetic tape will move farther from the saddle 55, the field sensed by the sensing device in the saddle 55 will change, and the wheel 56 will be turned to compensate for the deviation. The sensing device in the saddle 55 should contain two separate sensing means which can determine direction as well as strength. Thus, as the tape moves away from one sensing head and toward the other, the field sensed by the one head becomes weaker, and the field sensed by the other head becomes stronger to provide the steering mechanism 57 with information to turn the wheel 56 in the proper direction to compensate for the deviation and return the model 31 to its proper path.

The above specification describes a new and improved support and drive means for a model sphere which can represent a celestial body, or the like, and which does not require external support members for its operation. The device described above is simple and rugged in its construction, reliable in its operation, and is inexpensive to build and maintain.

It is realized that the above description and the accompanying drawings may indicate to others in the art additional ways in which the apparatus of this invention may be used without departing from the principles of the invention. It is, therefore, intended that this invention be limited only by the scope of the appended claim.

What is claimed is:

1. Apparatus for supporting a generally spherical body and for controllably causing said body to roll in place so that selected aspects of said body are made available to a given point of view, said apparatus comprising a base upon which said body rests, rotatably driven friction means mounted on said base to frictionally engage the outer surface of said body and cause it to rotate, means mounted within said body to compensate for transverse forces which tend to cause said body to rotate in a direction other than that desired, said compensating means comprising a generally annular guide having an outside circumference which substantially coincides with the inside circumference of said body and a mass within said guide so shaped as to roll freely within said guide, said rotatable friction means comprising at least one pair of wheels mounted on a single axis, the home position of said mass being generally between the two wheels of said pair, the effect of said mass being to oppose movements of said body which are generally transverse to said guide, said guide comprising a plurality of rings approximately the diameter of said body, and means for connecting said rings together to form a generally annular cage within said body.

References Cited
UNITED STATES PATENTS

| | | | |
|---|---|---|---|
| 2,340,023 | 1/1944 | Sites | 35—46 |
| 2,431,847 | 12/1947 | Van Dusen | 35—46 X |
| 2,694,859 | 11/1954 | Gwillam | 35—46 X |
| 2,957,252 | 10/1960 | Pain | 35—46 |
| 3,003,257 | 10/1961 | Madden | 35—43 |
| 3,058,239 | 10/1962 | Madden | 35—46 |
| 3,070,792 | 12/1962 | Neasham | 35—46 X |

JEROME SCHNALL, *Primary Examiner.*